United States Patent

Schuler

[11] Patent Number: 5,540,969
[45] Date of Patent: Jul. 30, 1996

[54] INSULATING TAPE AND METHOD OF PRODUCING IT

[75] Inventor: Roland Schuler, Wettingen, Switzerland

[73] Assignee: Asea Brown Boveri Ltd., Baden, Switzerland

[21] Appl. No.: 166,817

[22] Filed: Dec. 15, 1993

[30] Foreign Application Priority Data

Dec. 28, 1992 [DE] Germany ............... 42 44 298.2

[51] Int. Cl.⁶ .............. B32B 3/02; B32B 5/16; B32B 27/06; C09J 5/00
[52] U.S. Cl. .......... 428/248; 428/198; 428/233; 428/284; 428/286; 428/324; 428/474.4; 428/480; 428/241; 428/242; 156/305
[58] Field of Search ............ 428/324, 97, 198, 428/241, 474, 240, 480, 233, 284, 286, 248; 156/305

[56] References Cited

U.S. PATENT DOCUMENTS

| | | | |
|---|---|---|---|
| 3,476,589 | 11/1969 | Raphael et al. | 428/268 |
| 3,484,333 | 12/1969 | Vanderbilt | 428/268 |
| 3,579,409 | 5/1971 | Shannon | 428/268 |
| 3,654,056 | 4/1972 | Nisbet et al. | 428/268 |
| 4,606,785 | 8/1986 | Zeise | 156/305 |
| 4,806,806 | 2/1989 | Hjortsberg et al. | |
| 5,079,077 | 1/1992 | Sakayanagi et al. | |

FOREIGN PATENT DOCUMENTS

| | | |
|---|---|---|
| 2261686 | 7/1973 | Germany . |
| 2818193 | 11/1979 | Germany . |
| 3017490 | 11/1981 | Germany . |
| 3049940 | 3/1982 | Germany . |
| 3838345 | 5/1990 | Germany . |
| 528616 | 11/1976 | U.S.S.R. . |

Primary Examiner—Thurman K. Page
Assistant Examiner—Kathryne E. Shelborne
Attorney, Agent, or Firm—Oblon, Spivak, McClelland, Maier, & Neustadt, P.C.

[57] ABSTRACT

To improve the thermal conductivity of the main insulation of an electrical machine, an insulating tape is proposed which is composed of one or more glass-fabric layers (6) and mica layers (5). Only essentially the interspaces of the glass fabric (6) which is made up of glass threads (7) are filled with a resin (8) which is provided with a filler containing microscopically small particles (9) having a thermal conductivity which is greater than that of the resin. To protect the glass threads (7) of the fabric, its threads (7) are provided with a protective coating (10) of resin or lacquer, said protective coating (10) essentially only surrounding the threads of the glass fabric (6), but otherwise not completely filling the interspaces of the fabric. A main insulation made up of such an insulating tape fulfils all the requirements with regard to mechanical and thermal stability and electrical strength.

4 Claims, 1 Drawing Sheet

INSULATING TAPE AND METHOD OF PRODUCING IT

BACKGROUND OF THE INVENTION

1. Field of the Invention

The invention relates to an insulating tape which is composed of one or more fabric layers and mica layers and in which the interspaces of the fabric, which is made up of threads, are essentially filled with a resin which is provided with a filler containing microscopically small particles having a thermal conductivity which is greater than that of the resin.

The invention furthermore relates to a method of producing such an insulating tape.

2. Discussion of Background

Large electrical machines having indirectly cooled stator winding impose high requirements on the temperature stability of the winding insulation. Because the heat produced in the conductor copper has to be removed via the main insulation to the (cooled) stator sheet-metal body, said insulation cannot be made indefinitely thick, but, on the other hand, a certain minimum thickness of the main insulation has to be maintained in the case of high-voltage machines with rated voltages of 16 kV and over. There is therefore a great need for high-voltage-resistant insulation materials which have at the same time good thermal conductivity.

The main insulation of the stator winding according to U.S. Pat. No. 4,806,806 or the substantively identical EP-A-0 266 602 comprises a multilayer insulating tape which is wound in many layers around the conductor assembly. The insulating tape is either provided with impregnating resin beforehand or the latter is applied only after the insulating tape has been wound on. The insulating tape itself is composed of a plurality of thin mica layers and reinforcing glass-fabric layers. To improve the thermal conductivity, an inorganic filler having good thermal conductivity, for example boron nitride, aluminum nitride, silicon nitride, aluminum oxide, magnesium oxide, beryllium oxide or silicon carbide, having a particle size of 0.1–15 µm is added to the impregnating resin, the filler content being at least 90% by weight in the interspaces of the glass fabric.

In U.S. Pat. No. 4,806,806 it is pointed out that it is ostensibly of great importance to work with small particle sizes because, on the one hand, the homogeneity of the mixing is thereby improved and, on the other hand, the risk of damage to the sensitive mica layer is ostensibly reduced. The inventors of said patent specification have, however, ignored the fact that the particles of the filler also, and to a particular extent, mechanically attack the fabric threads of the glass fabric. Said fabric threads are composed of fine to superfine glass fibers which are twisted together, the fiber diameter being of the order of magnitude of the particle size of the filler. These sharp-edged particles may damage the fabric threads even during winding and even more so during the subsequent pressing operations, with the result that the glass fabric can no longer, or only incompletely, fulfil its intended purpose of being support and reinforcement for the mica.

SUMMARY OF THE INVENTION

Accordingly, one object of the invention is to provide a novel insulating tape which has a comparatively high thermal conductivity without impairment of its electrical insulating properties and of its strength.

The object of the invention is furthermore to provide a method of producing such a tape.

This object is achieved, according to the invention, by an insulating tape wherein the threads of the fabric are provided with a protective coating of resin or laquer, said protective coating essentially only surrounding the threads, but otherwise not completely filling the interspaces of the fabric, and wherein the proportion of mica compared with the filler, expressed in % by weight, is greater than or at least equal to 1.

An insulation which is composed of insulating tapes made up in this way is notable for high electrical, thermal and mechanical service life. Because the impregnating resin with filler added is situated essentially only between the interspaces of the fabric but not in the mica layer, the dielectric strength of the insulation is increased even further. The sharp-edged particles of the filler cannot scratch the sensitive threads, or the fibers of which the threads are composed, with the result that the mechanical strength also continues to be maintained during the production of the tape and its application to the conductor rod, and during the subsequent operation. The good thermal coupling of adjacent mica layers (the latter in any case have good thermal conductivity themselves) is assured by the impregnating resin which now also has good thermal conductivity.

In this connection, to produce the insulating tape, the procedure essentially comprises first coating the threads of the fabric with a low-viscosity resin, preferably epoxy resin, so that essentially only the threads are coated with a protective layer but the resin does not completely fill the interspaces of the fabric. Then the filler, suspended in a binder resin, is applied to the fabric by a roller calendering method. The fabric pretreated in this way is then bonded to the mica layer.

Exemplary embodiments of the invention and also the advantages achievable therewith are explained in greater detail below with reference to the drawing.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

LIST OF DESIGNATIONS

Figure 1:
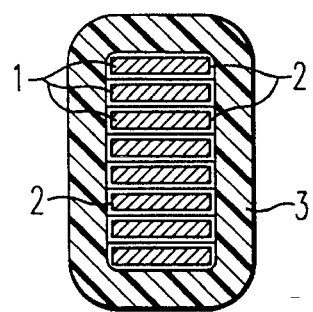
FIG. 1: shows a section through a conductor bar of an electrical machine, which conductor bar is made up of subconductors which are insulated from one another and are provided with a main insulation.

1 Subconductor
2 Subconductor insulation
3 Main insulation
4 Insulating tapes
5 Mica layers
6 Glass-fabric layers
7a Warp thread
7b Weft thread
8 Resin 9 Metal oxide particles
10 Protective layer
11 Glass fibers

DESCRIPTION OF THE PREFERRED EMBODIMENTS

Referring now to the drawings, wherein like reference numerals designate identical or corresponding parts throughout the several views in FIG. 1 a conductor bar of an electrical machine comprises a multiplicity of subconductors 1 which are insulated from one another and which are each provided with a subconductor insulation 2. The subconductors 1, which are assembled to form a conductor assembly, are surrounded by a main insulation 3.

Figure 2A:
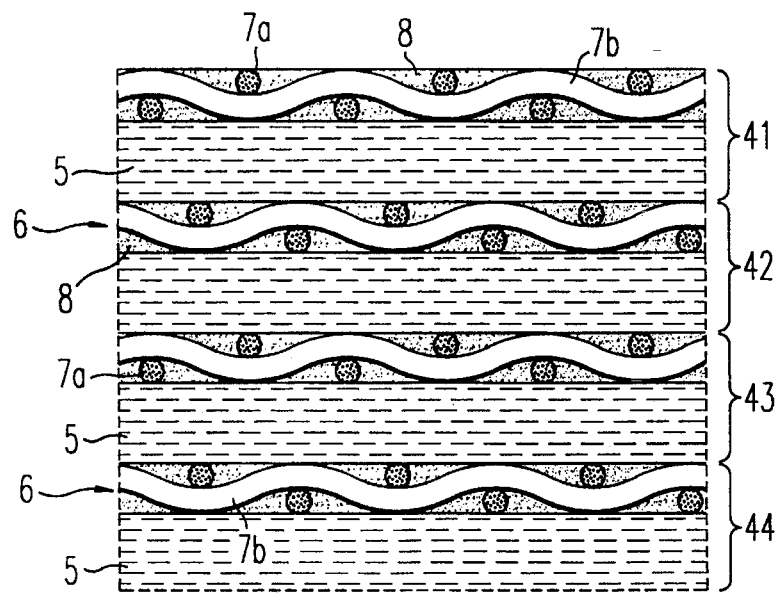
FIG. 2: shows a considerably enlarged detail from FIG. 1 which illustrates the structure of the main insulation.
Figure 2B:
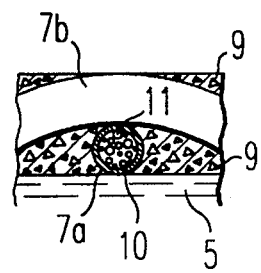

The considerably enlarged detail shown in FIG. 2 reveals the layerwise construction of the main insulation from a multiplicity of insulating tapes 41, 42, 43, 44 wound one on top of the other.

Each insulating tape 41, 42, 43, 44, . . . has two plies or layers: a mica layer 5 and a glass-fabric layer 6. The interspaces of the glass fabric having warp threads 7a and weft threads 7b, i.e. the space between two adjacent glass threads of the glass fabric 6, are/is completely filled with a resin 8 to which a metal oxide powder 9 having particle sizes between 0.1 and 15μ has been added. The mica layers 5, on the other hand, contain virtually no metal oxide powder.

To this extent, the construction of the insulating tape corresponds to that of U.S. Pat. No. 4,806,806 mentioned at the outset.

According to the invention, the warp threads 7a and the weft threads 7b of the glass fabric are now provided with a protective layer 10 whose thickness is of the order of magnitude of the size of the particles 9 and is about 1 μm to 10 μm, preferably 3 μm to 5 μm. Said protective layer 10 prevents scratching of the glass threads which are composed of extremely thin glass fibers 11. The protective layer 10 is preferably composed of a flexibilized epoxy resin which is compatible with the impregnating resin used later and also wets the glass threads 7a and 7b and glass fibers 11 well.

A preferred embodiment of the insulating tape according to the invention has the following typical parameters:

Layer thickness of the glass-fabric layer 6: 50 82 m
Layer thickness of the mica layer 5: 100 μm
Thickness of the weft and warp threads: 25 μm
Thickness of the fibers or filaments: 8 μm
Thickness of the protective layer 10: 5 μm
Particle size of the aluminum oxide powder: 3 μm
Binder resin 8: epoxy resin Instead of glass fabric, a so-called mixed fabric comprising warp threads 7a made of glass threads and weft threads 7b made of plastic, for example polyester, may also be used.

In this connection, to produce the insulating tape the procedure essentially comprises first coating the threads 7 of the glass fabric 6 with a low-viscosity resin, preferably epoxy resin, so that essentially only the threads are coated with the protective layer 10 but the resin does not completely fill the interspaces of the fabric. Then the filler (resin and metal oxide powder) is applied to the glass fabric by a roller calendering method. The fabric pretreated in this way is then bonded to the mica layer 5.

Obviously, numerous modifications and variations of the present invention are possible in light of the above teachings. It is therefore to be understood that, within the scope of the appended claims, the invention may be practiced otherwise than as specifically described herein.

What is claimed as new and desired to be secured by Letters Patent of the United States is:

1. An insulating tape which is composed of one or more fabric layers and mica layers and in which the interspaces of the fabric, which is made up of threads, are essentially filled with a resin which is provided with a filler containing microscopically small particles having a thermal conductivity which is greater than that of the resin, wherein the threads of the fabric are provided with a protective coating of resin or lacquer, said protective coating essentially only surrounding the threads of the fabric, but otherwise not completely filling the interspaces of the fabric, and wherein the proportion of mica compared with the filler, expressed in % by weight, is greater than or at least equal to 1.

2. The insulating tape as claimed in claim 1, wherein the filler is composed at least of a component which is selected from the group consisting of boron nitride, aluminum nitride, silicon nitride, aluminum oxide, magnesium oxide, beryllium oxide and silicon carbide, and the particle size of the filler is between 0.1 μm and 15 μm.

3. The insulating tape as claimed in claim 1 or 2, wherein the protective layer is composed of resin or lacquer and is between 1 μm and 10 μm.

4. The insulating tape as claimed in claim 1, wherein the fabric is glass fabric or a mixed fabric having a warp of glass threads and a weft of plastic, for example polyester.

* * * * *